United States Patent [19]

Espinoza

[11] Patent Number: 6,103,834
[45] Date of Patent: Aug. 15, 2000

[54] POLYMER COMPOSITION DERIVED FROM UNSATURATED VEGETABLE OILS

[76] Inventor: Abel M. Espinoza, 162 Southwind Dr., Pleasant Hill, Calif. 94523

[21] Appl. No.: 09/172,737

[22] Filed: Oct. 13, 1998

[51] Int. Cl.$^7$ .............................. C08F 20/00; C08F 2/46; C08G 63/48
[52] U.S. Cl. .......................... 525/437; 528/275; 528/280; 528/295.5; 528/297; 528/306; 525/438; 522/24
[58] Field of Search ................................ 528/275, 295.5, 528/297, 306, 280; 525/437, 438; 522/24

[56] References Cited

U.S. PATENT DOCUMENTS

| | | | |
|---|---|---|---|
| 4,970,010 | 11/1990 | Erickson et al. | 252/48.6 |
| 5,229,023 | 7/1993 | Landis | 252/57 |
| 5,733,970 | 3/1998 | Craun | 524/811 |

OTHER PUBLICATIONS

"Magic Beans: Soy Oil Forms New 'Green' Composite", ENN Daily News, Oct. 31, 1997.

*Primary Examiner*—Samuel A. Acquah
*Attorney, Agent, or Firm*—Theodore J. Bielen, Jr.

[57] ABSTRACT

A process for co-polymerizing unsaturated vegetable oils or fatty acids utilizing the steps of mixing the unsaturated vegetable oil or fatty acid with maleic anhydride in a container. Simultaneously, inert gas is added to the container to provide an oxygen free environment within the container. A sufficient amount of initiator is added to the mixture in the container to produce free radicals for the co-polymerization of the vegetable oil with this fatty acid or the maleic anhydride.

11 Claims, No Drawings

POLYMER COMPOSITION DERIVED FROM UNSATURATED VEGETABLE OILS

BACKGROUND OF THE INVENTION

The present invention relates to a novel and useful process for co-polymerizing unsaturated vegetable oils and fatty acids.

Polymerized vegetable oils have found use as lubricants, waxes, binders for wood products, and the like. Also, polymerized vegetable oils and fatty acids may be employed to disperse pigments in paints and in inks. Moreover, it is well known that vegetable oils and fatty acids that are polymerized are more valuable in the marketplace than in their natural state.

In the past, vegetable oils have been mixed with other components to provide a lubricant additive. For example, U.S. Pat. No. 4,970,010 describes such a process.

New U.S. Pat. No. 5,229,023 describes a group of lubricant additives that comprise telomerized triglyceride vegetable oils.

An article entitled "Magic Beans: Soy Oil Forms New 'Green' Composite," ENN Daily News, Oct. 31, 1997 describes the use of soy oil triglycerides and which are reformulated through the process of epoxidization.

A process for easily polymerizing unsaturated vegetable oils and fatty acids would be a notable advance in the chemical industries.

SUMMARY OF THE INVENTION

In accordance with the present invention a novel and useful process for co-polymerizing unsaturated vegetable oil and fatty acids is herein provided.

The process of the present invention utilizes an unsaturated vegetable oil such as castor oil, corn oil, cotton seed oil, grape seed oil, hemp seed oil, kapok oil, linseed oil, wild mustard oil, oiticica oil, olive oil, peanut oil, perilla oil, poppy seed oil, argentine rapeseed oil, rubberseed oil, safflower oil, sesame oil, soybean oil, sunflower oil, tall oil, tea-seed oil, tung oil, and ucuhuba oil. Also, unsaturated fatty acids such as tall oil fatty acids, and fatty acids of the unsaturated vegetable oils listed hereinbefore, and others will suffice. The important criteria for the starting product in the present invention is that the vegetable oil or fatty acid be unsaturated or partially saturated, having at least one double bond.

The process comprises the steps of mixing the unsaturated vegetable oil or fatty acid with maleic anhydride (cis-butadioic acid) in a container. Simultaneously, the container is blanketed with an inert gas such as nitrogen. Inert gas provides an oxygen-free environment in the container which is necessary for the co-polymerization of the unsaturated vegetable oil or fatty acid with the Maleic Anhydride.

A sufficient amount of initiator is also added to the container to produce free radicals for the co-polymerization of the vegetable oil or fatty acid and the maleic anhydride. The initiator may take the form of, t-butyl perbenzoate, dicumyl peroxide or other peroxide initiators suitable for this purpose. In certain cases a catalyst may also be added to the mixture in the container. For example, cobalt octoate has been found to serve as a catalyst in the process of the present invention.

In most of the reactions utilizing the ingredients and process of the present invention, the maleic anhydride may vary from 4 to 50 percent by weight. Preferably, maleic anhydride is employed between 15 and 30 percent by weight. The vegetable oil or fatty acid may be found in the range of 45 to 95 percent, and preferably in the range of 65 to 85 percent by weight. The initiator may range between 1 and 10 percent, preferably 2 to 5 percent by weight.

In addition, the mixture of the unsaturated vegetable oil or fatty acid, maleic anhydride, and the initiator may be heated to promote polymerization. The temperature of such mixture would vary between 150 and 300 degrees fahrenheit over a period of one to eight hours. In certain cases, a solvent may be used, such as xylene to lower viscosity and to promote further polymerization of the mixture.

The co-polymerized unsaturated vegetable oil or fatty acid and maleic anhydride component may be further cross-linked to form a solid by the use of polyols such as glycerine, pentaerythritol, Bisphenol A, neopentyl glycol, diethylene glycol, or similar materials. Other cross-linkers that may be used are oxiranes, or epoxies. One such epoxy is DGEBA (Diglycidyl ether of Bisphenol A). In such cases, the end products may be employed as binders for wood products or as packaging materials.

It may be apparent that a novel and useful process for co-polymerizing unsaturated vegetable oils or fatty acids with maleic anhydride is herein provided.

It is therefore an object of the present invention to provide a process for the co-polymerization of unsaturated vegetable oils or fatty acids which is simple and easy to carry out, resulting in a product that has many uses.

Another object of the present invention is to provide a process for the co-polymerization of unsaturated vegetable oils or fatty acids which utilizes maleic anhydride in an inert atmosphere to promote the production of free radicals by a peroxide bearing initiator.

Another object of the present invention is to provide a co-polymerization process for unsaturated vegetable oils or fatty acids which includes an end product which may be employed as a dispersion agent for pigments, or a coating for paper products.

A further object of the present invention is to provide a process for co-polymerizing unsaturated vegetable oils or fatty acids which may be cross-linked with polyols or epoxies to provide a solid material which is usable for coatings for adhesives, binders for wood products, and as packaging materials.

The invention possesses other objects and advantages especially as concerns particular characteristics and features thereof which will become apparent as the specification continues.

DETAILED DESCRIPTION OF THE PREFERRED EMBODIMENTS

Various aspects of the present invention will evolve from the following detailed description of the preferred embodiments thereof.

The end product of the present invention is produced by a process which may be described as co-polymerizing either an unsaturated vegetable oil or a fatty acid utilizing maleic anhydride. The polymerization takes place in a container which is blanketed with an inert gas such as nitrogen. A sufficient amount of initiator is added to produce free radicals for the co-polymerization of the vegetable oil or fatty acid and maleic anhydride. In most cases, the unsaturated vegetable oil or fatty acid ranges from 65 to 80 percent by weight while the maleic anhydride ranges from 15 to 30 percent by weight in the mixture. The initiator generally falls within the range of 2 to 6 percent by weight.

The polymerization may take place by the addition of heat, which maintains the temperature in the container from 150 to 358 degrees fahrenheit during a period of one to eight hours. The initiator may take the form of a peroxide-based material such as dycumyl peroxide, or other initiators of chemical polymerization such as t-butyl perbenzoate.

The co-polymer produced by the above-identified process may also be cross-linked by a cross-linking agent such as glycerine. The latter product is harder and more rubbery than the uncross-linked material formed in the present process.

While in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

The following examples are deemed to be illustrative of the invention but are not deemed to limit the invention in any manner.

EXAMPLE 1

400 grams of Wesson soya oil were mixed a reaction flask or container with 60 grams of maleic anhydride, 25 grams of 50 percent t-butyl perbenzoate were then added. The flask was equipped with a thermometer, a stirrer and a nitrogen sparger tube. Heat was applied to bring the mixture to 242° F. Nitrogen was bubbled from the sparger into the mixture at the same time. After 95 minutes, the heat was removed and the contents were transferred to a container. The liquid was straw colored and exhibited a viscosity of 7,200 cp at 80° F.

EXAMPLE 2

400 grams of Mazola corn oil were mixed with 80 grams of maleic anhydride with an initiator of dicumyl peroxide being added in the amount of 12 grams. Heat was applied and nitrogen was added through a sparger into the mixture. The mixture was brought to a temperature of 250 to 260 degrees Fahrenheit. After 130 minutes two more grams of dicumyl peroxide were added. 52 minutes later, the heat was removed and the contents were transferred to a container for observation. The liquid was straw to amber colored and extremely viscous and tacky. When allowed to cool to room temperature, the material became solid and deepened in color.

EXAMPLE 3

400 grams of tall oil fatty acid were mixed with 100 grams of maleic anhydride and 20 grams of dicumyl peroxide. In addition, 1.5 grams of cobalt octoate (12.0 percent) were used with 50 grams of xylene, as a solvent. Nitrogen was bubbled into the mixture through a sparger and heat was applied initially at 230° F. The exothermic reaction brought the mixture to a temperature of 368° F. after 35 minutes. After 45 more minutes, the temperature was allowed to settle at 240° F. 130 minutes after the initial heating, 5 grams of dicumyl peroxide was added to the mixture. Finally, heat was removed after six hours from the initial heating. The end products exhibited a viscosity of 990,000 cp at 25° C.

EXAMPLE 4

400 grams of soya oil, 100 grams of maleic anhydride and 15 grams of dicumyl peroxide were added to a container. 50 grams of xylene completed the mixture. Heat was applied to the mixture with nitrogen being bubbled through a sparger. After seven minutes and at a temperature of 125° F. the maleic anhydride was observed to melt. The mixture began boiling at 321° F. after 17 minutes. Heat was removed and the mixture was maintained between 240 and 245 degrees Fahrenheit. After 87 minutes, an additional five grams of dicumyl peroxide was added to the mixture. Finally, heat was removed after 100 minutes since the mixture was observed to become quite viscous. The material solidified at room temperature

EXAMPLE 5

The ingredients of Example 2 were polymerized according to the steps described therein. Eight grams of the resulting co-polymer was mixed with 0.62 grams glycerine. The end product was a hard rubbery solid when cooled to room temperature. It is believed that the co-polymer cross-linked with the glycerine.

EXAMPLE 6

The ingredients of Example 4 were polymerized according to the steps described therein. 25 grams of the resulting co-polymer were melted in a beaker over a hot plate. 5 grams of an epoxy resin (DGEBA or Diglycidyl ether of Bisphenol A) was added to the co-polymer and mixed. To this mixture, the catalyst of triethylamine was added in the amount of 0.3 grams. The mixture immediately formed a rubber when the catalyst was added. 5 grams of the resulting rubber was placed in an oven set at 110° C. After one hour in the oven, the end product was a hard tough brown solid.

What is claimed is:

1. A process for co-polymerizing an unsaturated vegetable oil or a fatty acid: comprising the steps of;

a. mixing the unsaturated vegetable oil or the fatty acid with maleic anhydride in a container;

b. simultaneously adding an inert gas to the container to provide an oxygen free environment in the container; and c. adding a sufficient amount of initiator to produce free radicals for the co-polymerization of the vegetable oil or fatty acid, and said maleic anhydride.

2. The process of claim 1 which additionally comprises the step of adding heat to said container following said step of adding an inert gas to the container.

3. The process of claim 1 which additionally comprises the step of adding a catalyst to said container.

4. The process of claim 3 which additionally comprises the step of adding heat to said container, following said step of adding an inert gas to the container.

5. The process of claim 1 in which said initiator is selected from the group consisting of dicumyl peroxide and t-butyl perbenzoate.

6. The process of claim 1 in which said mixture in said container consists essentially of the unsaturated vegetable oil or fatty acid from about 45 to 95 percent by weight, the maleic anhydride from about 4 to 50 percent by weight, and the initiator from about 1 to 10 percent by weight.

7. The process of claim 1 in which said mixture in said container consists essentially of the unsaturated vegetable oil or fatty acid from about 65 to 80 percent by weight, the maleic anhydride from about 15 to 30 percent by weight, and the initiator from about 2 to 6 percent by weight.

8. The process of claim 1 which additionally comprises the step of adding a cross-linking agent to mixture in the container.

9. The process of claim 8 in which said cross-linking agent is selected from the group consisting of an epoxy and a polyol.

10. A co-polymerized vegetable oil or fatty acid and maleic anhydride wherein from about 45 to 95 percent by weight of an unsaturated vegetable oil or fatty acid is mixed with from about 4 to 50 percent by weight of maleic anhydride in a container having an inert atmosphere and under the influence of an initiator from about 1 to 10 percent by weight.

11. The co-polymer of claim 10 which is cross-linked by a cross-linking agent selected from the group consisting of an epoxy and a polyol.

* * * * *